(12) United States Patent
Guering

(10) Patent No.: US 8,967,538 B2
(45) Date of Patent: Mar. 3, 2015

(54) HEADREST FOR AN AIRCRAFT PILOT'S SEAT AND SEAT COMPRISING A SUCH HEADREST

(71) Applicant: Airbus Operations SAS, Toulouse (FR)

(72) Inventor: Bernard Guering, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 123 days.

(21) Appl. No.: 13/708,167

(22) Filed: Dec. 7, 2012

(65) Prior Publication Data

US 2013/0147239 A1 Jun. 13, 2013

(30) Foreign Application Priority Data

Dec. 7, 2011 (FR) .................................... 11 61299

(51) Int. Cl.
*B64D 11/06* (2006.01)
*B64D 10/00* (2006.01)
*A62B 25/00* (2006.01)

(52) U.S. Cl.
CPC ............ *B64D 11/0689* (2013.01); *B64D 10/00* (2013.01); *A62B 25/005* (2013.01); *B64D 2011/0668* (2013.01); *B64D 2231/025* (2013.01)
USPC ............... 244/118.5; 297/188.01; 297/188.07

(58) Field of Classification Search
CPC ..................... B64D 2231/00; B64D 2231/025; B64D 2011/0672; B64D 25/10
USPC .......... 244/118.5, 118.6, 122 A, 141; 297/61, 297/188.01, 188.07, 188.13, 188.19, 391
See application file for complete search history.

(56) References Cited

U.S. PATENT DOCUMENTS

| 3,379,195 | A | * | 4/1968 | Bleach ..................... 128/205.25 |
| 3,568,890 | A | * | 3/1971 | Leachman .................... 222/183 |
| 4,003,599 | A | | 1/1977 | Takamatsu |
| 4,609,166 | A | * | 9/1986 | Brennan .................... 244/118.5 |
| 5,154,374 | A | | 10/1992 | Beroth |
| 5,984,415 | A | | 11/1999 | Schumacher |
| 6,493,128 | B1 | * | 12/2002 | Agrawal et al. ............... 359/265 |
| 7,434,766 | B2 | * | 10/2008 | Pozzi et al. ................. 244/118.6 |
| 2009/0045285 | A1 | * | 2/2009 | Mastrolia ............... 244/122 AG |
| 2009/0139519 | A1 | * | 6/2009 | Deutscher et al. ....... 128/202.26 |
| 2010/0288880 | A1 | * | 11/2010 | Bachelard et al. ......... 244/118.5 |
| 2012/0139304 | A1 | * | 6/2012 | Jang ......................... 297/188.04 |

FOREIGN PATENT DOCUMENTS

| EP | 0 763 466 | 3/1997 |
| FR | 2 298 453 | 8/1976 |
| FR | 2 753 170 | 3/1998 |
| WO | 2005/047104 | 5/2005 |

* cited by examiner

*Primary Examiner* — Tien Dinh
*Assistant Examiner* — Christopher Hutchens
(74) *Attorney, Agent, or Firm* — Dickinson Wright PLLC

(57) ABSTRACT

A headrest includes a first part referred to as the lower part, equipped with a connecting unit enabling an adjustable connection of the headrest to the seat back of a pilot seat, and a second part referred to as the upper part, located opposite the lower part, as well as a front face intended to serve as a support surface for the head of a user. A receptacle, connected to the mask, stores an oxygen mask and/or a supply line. The upper part of the headrest forms a hinged cover on the lower part of the headrest and it closes the receptacle. A seat, a cockpit, and an aircraft include such headrest.

16 Claims, 5 Drawing Sheets

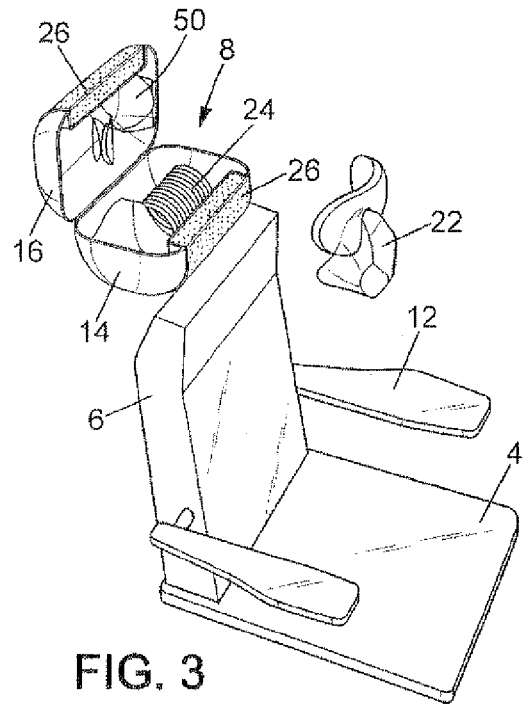
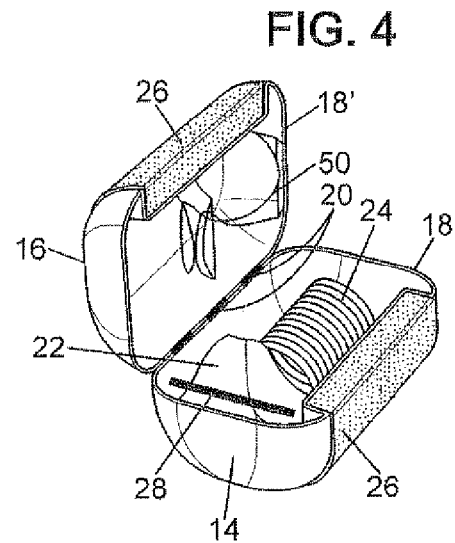
FIG. 3
FIG. 4
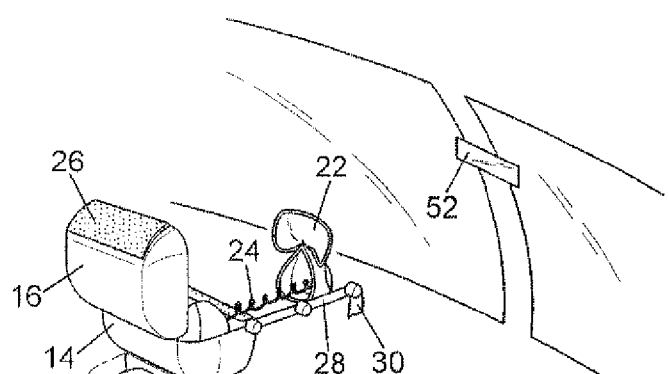
FIG. 5

HEADREST FOR AN AIRCRAFT PILOT'S SEAT AND SEAT COMPRISING A SUCH HEADREST

CROSS REFERENCE TO RELATED APPLICATION

This application is entitled to and claims the benefit of French Application No. FR 2011 61299 filed Dec. 7, 2011, the disclosure of which including the specification, drawings and abstract is incorporated herein by reference in its entirety.

FIELD

The present invention relates to a headrest for an aircraft pilot seat, and to an aircraft pilot seat which is equipped with such a headrest.

BACKGROUND

In the present document, the term aircraft pilot is understood to mean the pilot or copilot, as well as any person potentially participating in the piloting of an aircraft which occurs in the cockpit in order to assist the pilot and/or copilot in piloting operations or functions related to specific characteristics of the aircraft in question. A pilot and a copilot are usually required for commercial flights transporting passengers or goods. However, in military aircraft, a third person may be called upon to sit in the cockpit depending on the mission of the aircraft.

Aircraft comprising a pressurized fuselage are normally equipped with an emergency system which allows supplying oxygen to the occupants of the aircraft in case of depressurization. In an aircraft designed for transporting passengers, there is a cockpit in which are seated the pilot, copilot, and possibly other passengers who are generally members of the crew, and there is a cabin in which the passengers are travelling. There are clear regulatory requirements concerning the emergency oxygen supply system for passengers. Therefore, at least two systems for distributing oxygen in an emergency are found on board an aircraft intended for passenger transport, a first one for the personnel in the cockpit, and a second one for the passengers traveling in the cabin and for the crew on commercial planes.

Documents EP-0 763 466 and U.S. Pat. No. 5,984,415 disclose an aircraft cabin provided with an emergency oxygen supply system comprising an oxygen mask for each passenger in the cabin. According to the document, the oxygen masks are placed within a service unit which is added to the passenger seat in the form of a column placed on the side of the seat. Document FR 2 753 170 discloses a cabin configuration having seats which can convert into a small bed, and a compartment accommodating an oxygen mask that is integrated into the seats.

The field of the present invention relates to an aircraft cockpit, and in particular to a pilot seat and to supplying the seat with oxygen. As mentioned above, it also relates to the seat of a copilot and the seat of a potential third crew member.

The emergency oxygen supply system for the cockpit occupants conventionally consists of one or more oxygen bottles, oxygen masks, and a circuit connecting the bottles to the masks. The oxygen bottles are sometime installed directly in the cockpit of the aircraft, but more often they are located in an avionics bay under the cockpit. The oxygen masks are stored near the seats of the pilot and of the copilot. They can be found for example in the areas to the right and left of the pilot, commonly referred to as "consoles". One oxygen mask is thus found to the left of the pilot and another one to the right of the copilot. A circuit generally comprising rigid lines and flexible lines ensures the delivery of oxygen to the occupants of the cockpit. This circuit also includes elements for regulating the flow and pressure of the oxygen delivered to the oxygen masks.

Such an oxygen supply system is complex and is therefore expensive as well. It goes without saying that this system requires a certain amount of space and sometimes represents a barrier to the passage of other lines.

In addition, it should be noted that the position of the oxygen mask requires that space be reserved for it in the middle of the avionics systems. The need to provide storage space for the masks places constraints on the design of the cockpit. The lateral position of the oxygen mask relative to the pilot and the copilot, even though this mask is located in the immediate proximity of its potential user, is not necessarily the optimal position in terms of ergonomics. For example, a right-handed pilot will have to grasp the oxygen mask with his left hand.

SUMMARY

The objective of the present invention is therefore to provide a means for having an oxygen supply system in the cockpit which is simplified in comparison to known systems of the prior art. Preferably, the means provided by the invention are ergonomic and make it possible to grasp the mask as intuitively as possible. Preferably, the means used make it possible to implement an emergency oxygen supply system in the cockpit at a reduced cost compared to known systems of the prior art.

The present invention thus proposes a headrest for a pilot seat of an aircraft, comprising a first part referred to as the lower part, equipped with connecting means enabling an adjustable connection of said adjustable headrest to the seat back of a pilot seat, and a second part, referred to as the upper part, located opposite the lower part.

According to the present invention, such a headrest provides a receptacle in which are housed an oxygen mask as well as connecting means that connect said mask to an oxygen source (for example an oxygen supply line, an oxygen bottle, . . . ). The upper part can be moved with respect to the lower part, between a first position in which the upper part closes said receptacle and a second position in which it is possible to access and remove the oxygen mask from its receptacle.

The novel and original proposal of the invention is to store an oxygen mask in a headrest. This integration requires an adaptation of the headrest. This will then free up space in the cockpit and simplify its design and implementation by freeing up space in the consoles and removing barriers to cockpit wiring.

The upper part per se may consist of several parts. It is not necessarily in the form of a single part.

In one embodiment of a headrest according to the present invention, the upper part forms a cover for the receptacle arranged in the lower part. It is also possible to provide hinged means connecting the upper part to the lower part so that the upper part can pivot relative to the lower part. These hinged means are simple, reliable, and permit excellent access to the receptacle inside the headrest. They are advantageously located on a rear face opposite the front face intended to serve as a support surface for the head of a user. The upper part can thus easily pass from its first position to its second position without interference by the head of a user who is using the headrest. Alternatively, the upper part can be realized in two parts so that the each of the parts is hinged with respect to the lower part and the hinge axis can then be a lateral axis. The upper part would in this case close the receptacle with two hinged flaps.

The receptacle can also contain a supply line which is connected to the oxygen mask and coiled inside the receptacle to facilitate extraction of the oxygen mask from its receptacle.

Since the oxygen mask is behind the head of the prospective user, this user cannot easily see whether or not the oxygen mask is accessible. It is therefore proposed that a headrest according to the invention should further comprise:

an arm movable between a position in which it is completely retracted inside the receptacle and a deployed position in which a free end of the arm is extended outside of the receptacle, and means enabling said arm to move from its retracted position to its deployed position when the cover is moved from a position in which the receptacle is closed to a position in which the receptacle is open.

In this embodiment, in order to facilitate the removal of the oxygen mask from its housing, the arm is advantageously equipped at its free end with grasping means which are connected to the oxygen mask stored in the receptacle. It is then sufficient to simply pull on the grasping means in order to remove the mask from its housing.

The present invention also relates to an aircraft pilot seat comprising a headrest as described above.

Advantageously, such a seat has at least one oxygen bottle, and the bottle is preferably connected to an oxygen mask placed inside the headrest. The emergency oxygen supply circuit is then small and limited to the seat. This variant clearly simplifies the design of a cockpit integrating such a seat.

A seat according to the present invention advantageously further comprises another oxygen mask stored in the headrest.

As an alternative, the seat according to the invention may comprise another receptacle in which is located another oxygen mask.

The present invention also relates to the cockpit of an aircraft, comprising at least one seat as described above. This aircraft cockpit includes, for example, a first seat as described above, a second seat as described above and aligned with the first seat, as well as at least one other seat arranged behind the first seat and the second seat, at least one among said first seat or said second seat advantageously having two oxygen masks. While supplying oxygen to only two seats, it is possible to furnish oxygen to three (or more) persons.

An aircraft cockpit according to the present invention advantageously has both the first seat and the second seat equipped with at least one oxygen bottle. As mentioned above, the design of the oxygen supply system and the design of the actual cockpit is thus simplified.

To facilitate grasping the oxygen mask in the headrest, it is advantageous to place a rearview mirror in front of the seat. The user can thus coordinate his actions with his view in the mirror when grasping the oxygen mask.

Finally, the present invention also relates to an aircraft comprising at least one seat as described above.

BRIEF DESCRIPTION OF THE DRAWINGS

Details and advantages of the present invention will be more apparent from the following description and the attached drawings, in which:

FIG. 3 is a perspective view showing a headrest according to the present invention in the open position, FIG. 4 shows a detailed view of FIG. 3 with the addition of an indicator arm in the folded position, FIG. 5 shows a perspective view of a seat according to the present invention, showing the indicator arm in the deployed position.

DETAILED DESCRIPTION OF EMBODIMENTS

Figure 1:
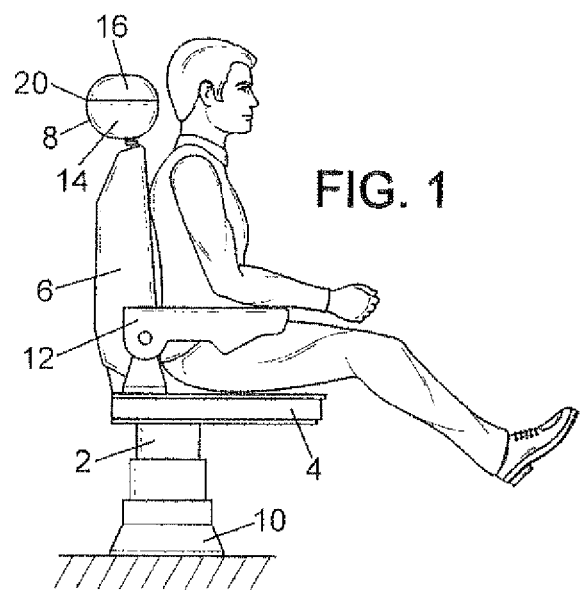
FIG. 1 illustrates a seat according to the present invention in a side view.
Figure 12:
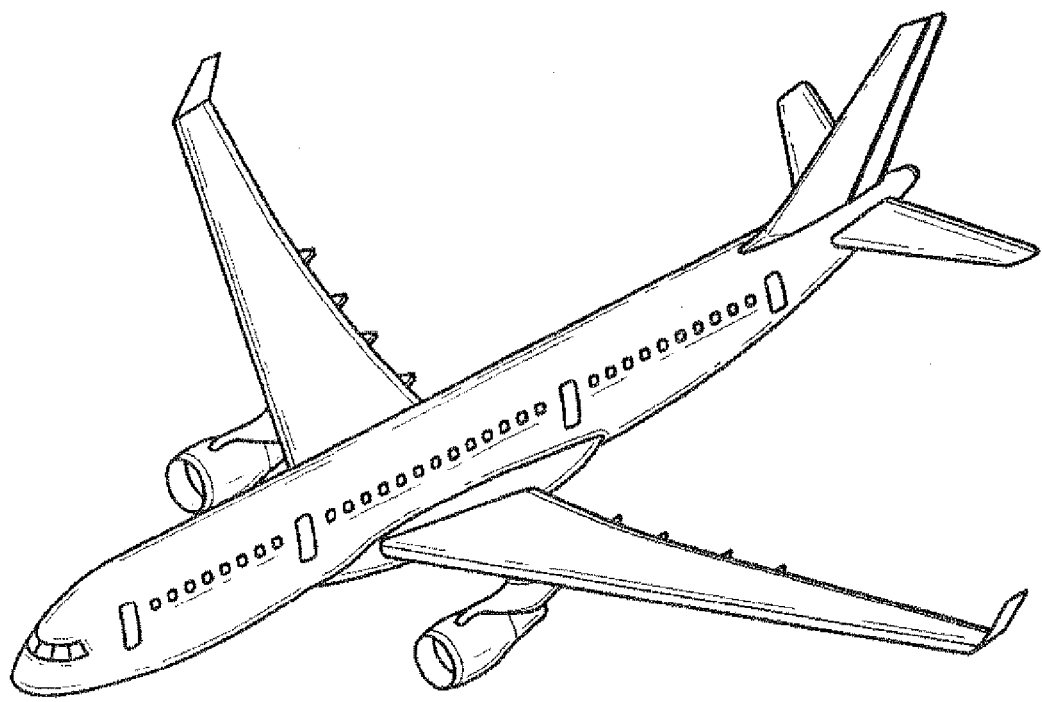
FIG. 12 is a perspective view of an aircraft according to the invention.

FIG. 1 shows an aircraft seat designed to be mounted on the floor of a cockpit. This seat comprises a column 2, a seat bottom 4, a seat back 6, and a headrest 8 mounted above the seat back 6. This type of aircraft seat is intended for placement in the cockpit of an aircraft such as the aircraft shown in FIG. 12.

A base 10 allows attaching the seat to the floor of the cockpit. This base 10, substantially in the shape of a truncated cone, has an opening on its top into which the column 2 is placed. The column forms a central telescoping pedestal supporting the assembly formed by the seat bottom 4, the seat back 6, and the headrest 8, and it allows adjusting the height of this assembly. The seat bottom 4 is supported by the column 2. It incorporates the usual functions of a seat bottom of a pilot seat.

Figure 2:
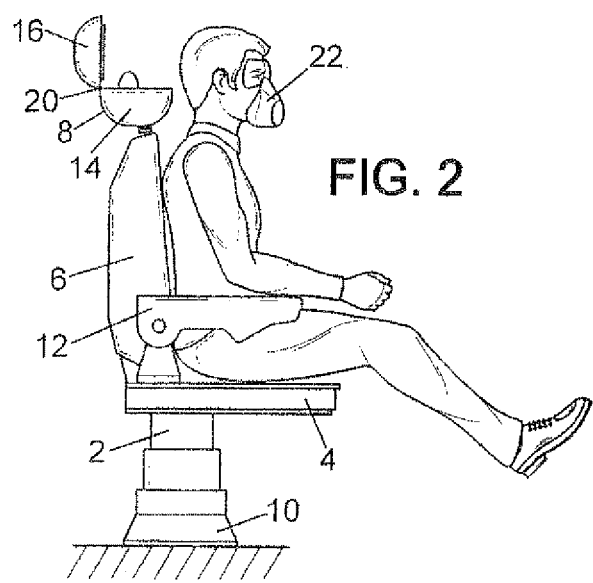
FIG. 2 shows the same seat in a view similar to that of FIG. 1, with the oxygen mask in use.

Throughout this entire description, it is assumed that the column 2 is oriented substantially vertically and that the seat bottom 4 is located above the column 2. The seat back 6 is at the rear of the described seat. The directions up/down and forward/backward are thus defined in this manner. The right/left directions are relative to a pilot sitting on the seat as represented by the example in FIGS. 1 and 2.

The seat back 6 has the conventional structure of a pilot seat back. It is connected by its lower part to the rear of the seat bottom 4 and it supports the headrest 8 on its upper part. It also supports an armrest 12 on each side.

As shown in particular in FIGS. 2 to 5, the headrest 8 consists of two parts, a lower part 14 and an upper part 16.

The lower part 14 is equipped with connecting means cooperating with complementary connecting means of the seat back in a manner that allows maintaining and adjusting the headrest 8 relative to the seat back 6. The connecting means and the complementary connecting means can be the means conventionally used for a pilot seat when implementing an adjustable connection between the back of said seat and its headrest. These means are thus known to persons in the art and they are not further described here.

In addition, the lower part 14 is hollow and forms a receptacle described in more detail below.

The upper surface of the lower part 14 is substantially flat and horizontal. A large central opening allowing access to the receptacle is surrounded by a peripheral edge 18. This peripheral edge 18 is, for example, generally rectangular in shape with rounded corners. The orientation of the headrest 8 is such that the peripheral edge 18 has a large front side, a large rear side, and two lateral sides.

The upper part 16 of the headrest 8 is hinged to the lower part 14. This hinged connection is realized by means of hinges 20 placed on the peripheral edge 18 of the large rear side (FIG. 4). At least one of these hinges 20 is an elastic hinge which allows maintaining the upper part 16 in its open position. The figures show hinges allowing the upper part 16 to be opened to 90° (relative to the closed position). This angle is preferably at least equal to 90°. As will be explained below, it may be advantageous, in particular when the upper part 16 is also used as storage space, to open to an angle of more than 90°, for example 120° or even 180° (or more).

The upper part 16 thus forms a cover which can be used to close the receptacle arranged in the lower part 14. The headrest 8 thus forms a box. In order to increase the volume of the storage space inside the box, the upper part 16 of the headrest is preferably also hollow. The upper part 16 thus has a peripheral edge 18' which sits atop the peripheral edge 18 in the closed position of the headrest 8 (see for example FIG. 1).

The space inside the headrest is used to store at least one oxygen mask 22 and one supply line 24. Depending on the size of the headrest and the space available inside it, the headrest 8 could be also used to store various equipment, in particular the equipment normally stored in the cockpit of an aircraft.

The oxygen mask 22 is designed to cover most of the face of the user. It has a housing which is designed to accommodate the chin, the mouth and the nose of the user, and it also comprises a transparent part designed to cover the eyes of the user. It is, for example, an oxygen mask known to persons in the art and generally used for the pilot of an aircraft.

The oxygen mask 22 is supplied with oxygen by means of the line 24. This line is advantageously provided in the form of a coiled tube. It may be a tube made of a synthetic material, for example. This line is connected to an oxygen distribution system, for example a system described below, and it thus connects the oxygen mask to this system.

For the comfort of the user occupying the seat, the headrest 8 is equipped on its front face with two foam blocks 26. A first foam block 26 is arranged on the front face of the lower part 14 of the headrest 8 and a second foam block 26 is arranged on the front face of the upper part 16 of the headrest 8, when the headrest is in the closed position.

A preferred embodiment of the headrest according to the invention includes the presence of an indicator arm 28. This indicator arm is placed for example in the receptacle, near a lateral side of the peripheral edge 18. This indicator arm has a folded position inside the lower part 14 (FIG. 4) and a deployed position (FIG. 5), in which the user (pilot) sitting on the seat sees a part of the indicator arm 28 located outside of the lower part 14. The indicator part 28 is formed, for example, from two segments which are elastically hinged relative to each other. In the folded position, the two segments of the indicator arm 28 are folded atop one another and arranged inside the lower part 14. The entire indicator arm 28 is mounted to pivot with respect to the lower part 14 and is elastically pretensioned. The indicator arm 28 is fitted with springs such that it moves automatically from the folded position inside the headrest to the deployed position when the headrest 8 opens. The indicator arm 28 deploys toward the front. The user can thus immediately observe that the headrest has opened and that the oxygen mask 22 is accessible even though the mask is located behind him.

The end of the arm 28 is advantageously equipped with a flag 30, which preferably is of a bright color as is the indicator arm 28. This flag 30 can be associated with grasping means, such as for example a ring or a tab. These grasping means are connected by a simple connection to the oxygen mask 22. By grasping and pulling on the tab, the user can remove the oxygen mask 22 from its housing. This greatly facilitates the extraction of the oxygen mask from the headrest 8. In the embodiment which is shown in the drawing, the indicator arm 28 deploys to the right of the head of the user. Whether the user is right-handed or left-handed, he can grip the grasping means at the end of the indicator arm 28 very easily and intuitively, either with his right hand or with his left hand, and quickly take hold of the oxygen mask.

It is preferred to have the opening of the headrest 8 be controlled automatically. A person skilled in the art is familiar with opening mechanisms that implement an automatic opening of a cover or similar element in the event of depressurization. Such a device is commonly used to release oxygen masks in an aircraft cabin designed for passenger transport.

FIGS. 6 to 11 illustrate the use of a seat in an aircraft cockpit as described above.

Figure 6:
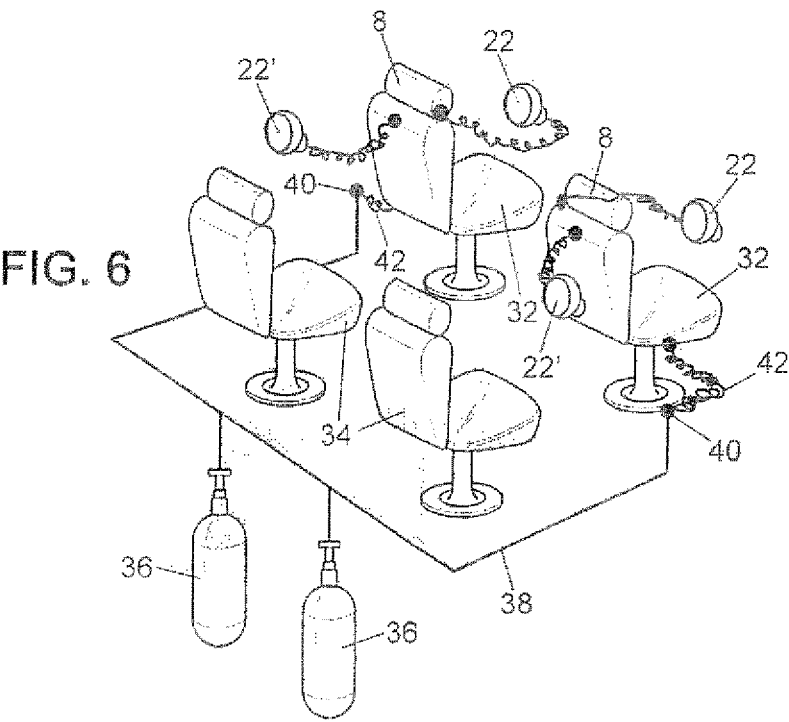
FIG. 6 is a schematic view of seats in the cockpit of an aircraft, and an oxygen supply system for the occupants of said seats.
Figure 7:
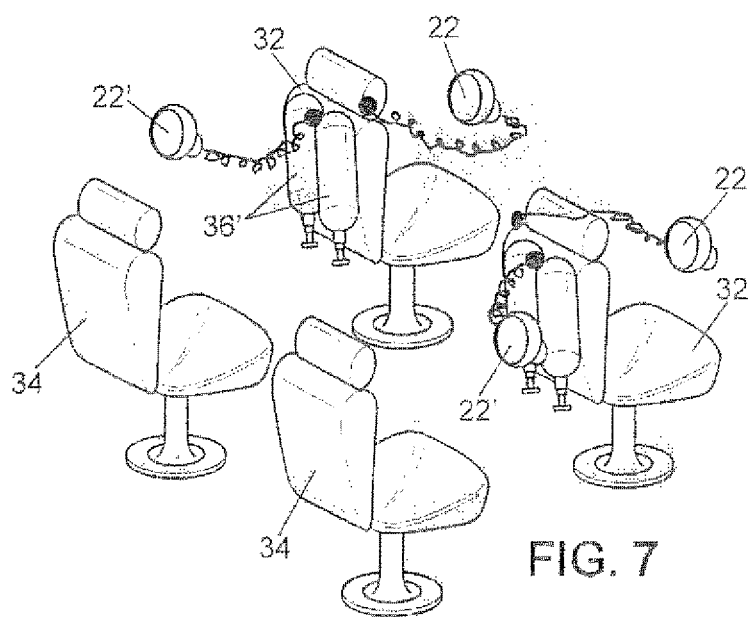
FIG. 7 shows a view similar to FIG. 6 of a variant of the oxygen supply system.

FIGS. 6 and 7 show a cockpit of an aircraft in which there are four seats. These seats are arranged in two rows of two seats. A pilot seat and a copilot seat are in the front row. As was already mentioned above, the present invention relates to a pilot seat as well as to a copilot seat. It can also relate to any seat intended to accommodate a crew member in an aircraft cockpit.

FIGS. 6 and 7 show two first seats 32 and two second seats 34. The first seats 32 correspond to a pilot seat and copilot seat as described above. The second seats 34 are arranged behind the first seats 32. The second seats 34 are represented in FIGS. 6 and 7 in the same manner as the first seats 32. However, this representation is schematic and the second seats could be folding seats, for example. For example, these second seats 34 could accommodate an observer or an instructor, and/or a member of the plane crew.

The embodiment of FIG. 6 provides a system for supplying emergency oxygen to each person who could be sitting in the seats represented in the drawing. This oxygen supply system comprises oxygen bottles 36, placed for example in a bay under the cockpit containing the first seats 32 and second seats 34.

Figure 8:
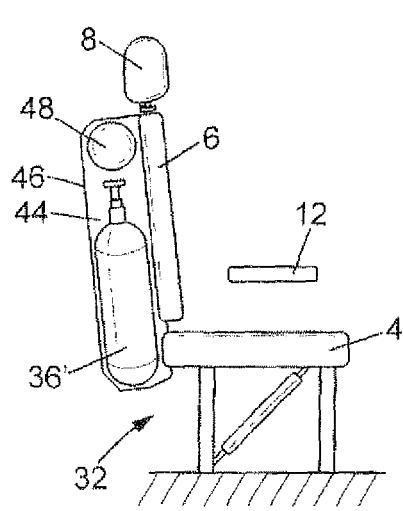
FIGS. 8 through 11 show respective schematic side views of variants of a seat according to the invention, illustrating example positions for an oxygen mask for a user who is not the occupant of the seat represented.
Figure 9:
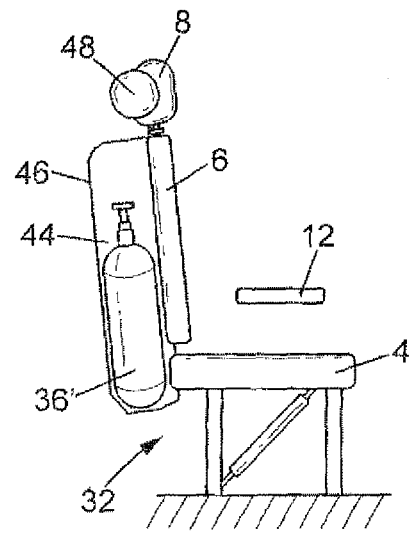
Figure 10:
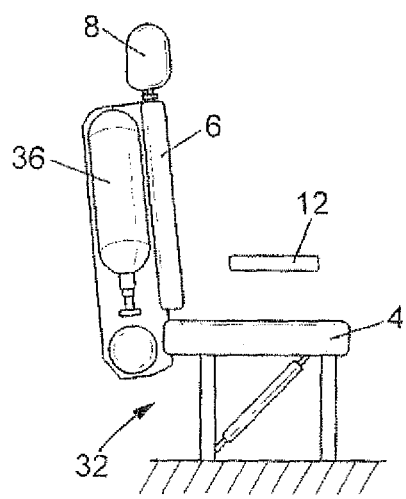
Figure 11:
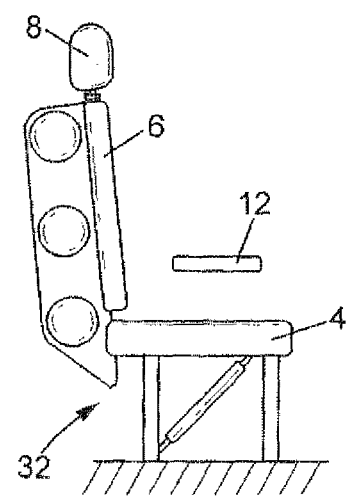

The oxygen bottles 36 feed oxygen to a circuit 38. This circuit 38 has only two outlets 40, one for each first seat 32. Each outlet 40 is, for example, connected by a flexible line 42 at a point of the corresponding seat 32. A conduit internal to said seat is provided to supply the oxygen mask associated with the corresponding headrest 8. It should be noted that each of the first seats 32 in FIG. 6 is also equipped with another oxygen mask 22' as illustrated in FIGS. 8 and 11 which will be described later. This second oxygen mask 22' can be in several positions when not in use.

It is also possible to have an embodiment (not shown) in which the oxygen mask located in a headrest of a first seat is intended for an occupant of a second seat. The oxygen mask intended for the occupant of the first seat could then be located in a console, or in the seat bottom of the first seat, etc.

In the embodiment shown in FIG. 7 (also corresponding to the seat illustrated in FIG. 5, 8, 9 or 10), two oxygen bottles 36' are fixed to the seat back 6 of each of the first seats 32. These oxygen bottles 36' are preferably covered by a hood, which is not shown in FIG. 7 in order to show the oxygen bottles 36'. These oxygen bottles are a source of oxygen for the person occupying the corresponding first seat 32, as well as for the person occupying the second seat 34 placed behind this first seat.

In this description, the oxygen bottles 36, 36' in all the embodiments are bottles containing gaseous oxygen under pressure. In this case each bottle contains oxygen gas, as opposed to existing devices in which a reagent is used to produce the oxygen. A bottle of gaseous oxygen, such as those used in the present description, provides greater autonomy. It is of course also possible to use another source of oxygen, of a different type, without departing from the scope of the present invention FIGS. 8 through 11 illustrate examples of positions that can be occupied by an oxygen mask on a first seat 32. It is assumed here that the first seats 32 are seats as described above, which have an oxygen mask 22 located inside the headrest 8.

In the embodiments shown in FIGS. 8 through 11, as well as the embodiment in FIG. 5, the construction of the seat is slightly different from the construction described above. There is indeed a seat bottom 4, a seat back 6, and a headrest 8; however, there is no column supporting the seat as was described above.

In the embodiment of FIG. 8, at least one oxygen bottle 36' is fixed to the rear part of the seat back 6, with the opening of each oxygen bottle 36' facing upwards. Under these conditions, the invention proposes arranging space on the rear of the seat back 6, in the upper part of a housing 44 enclosed by a hood 46, for receiving an oxygen mask 22' as illustrated for example by the circle 48 shown in FIG. 8. A lid which preferably opens automatically, arranged in the hood 46, provides access to the oxygen mask located in the housing symbolized by the circle 48 so it is accessible to a user located in the second seat 34 placed behind the first seat 32 shown in FIG. 8.

In the embodiment of FIG. 9, there is again a housing 44 located on the rear of the first seat 32, enclosed by a hood 46 and accommodating at least one oxygen bottle 36'. The opening of each oxygen bottle 36' is again facing upwards. Here, as shown schematically by the circle 48, the embodiment proposes placing another oxygen mask in the headrest 8. In this embodiment, it is possible to have a first oxygen mask located in the lower part of the headrest 8, while another oxygen mask is located in the upper part of the headrest 8. While in the embodiments illustrated for example in FIGS. 4 and 5, the upper part 16 of the headrest 8 pivots at an angle of about 90° relative to the lower part 14 of the headrest 8 when moving from the closed position to the open position of the headrest, it is proposed here to allow the upper part of the headrest to pivot 180° relative to the lower part of the headrest. In the open position of the headrest 8, the upper part and the lower part of this headrest are thus located side by side. The person sitting in the first seat 32 (which corresponds to the seat supporting the headrest 8) can access his oxygen mask as described above. A user located in a second seat 34 placed behind the first seat 32 can easily grasp the oxygen mask located in the upper part of the headrest. In this embodiment, it is not necessary to provide an indicator arm for the occupant of the second seat because he will immediately notice the opening of the headrest 8 in front of him.

FIG. 10 again shows a seat with a housing 10 enclosed by a hood 46 on the rear of the seat. At least one oxygen bottle 36' is fixed to the rear of the seat back 6 and is covered by the hood 46. In the embodiment represented here, the oxygen bottle 36' is placed with its opening facing down. This embodiment proposes placing an oxygen mask in the housing 44 and underneath the bottle or bottles, at the location represented by the circle 48, for an occupant of a seat located behind the seat represented. The oxygen mask is thus located substantially at the base of the seat back 6 and/or behind the seat bottom 4.

FIG. 11 illustrates a variant embodiment of a first seat 32 for an oxygen supply system as shown in FIG. 6. The position of the oxygen bottles is changed in the case indicated in this figure. Space can potentially be arranged on the rear of the seat back 6 in order to accommodate one or several oxygen masks. It is also possible to allow for the case where the seats located in the cockpit are not arranged as shown in FIG. 6 or 7. For example, there may be two folding seats located behind the pilot seat or behind the copilot seat. In such a case, the presence of several masks on the rear of the seat back 6 of the pilot seat (or copilot seat) can also be possible.

In the various embodiments described above, the overall volume of the headrest is increased relative to the volume of a headrest according to the prior art, to make it possible to store in the headrest an oxygen mask which is then connected to an oxygen supply line. However, the headrest must continue to perform its head support function and it is therefore arranged, as described above, with a foam-covered area on its front face, which is to say on the area which will come into contact with the head of a user occupying the corresponding seat. In addition, the headrest is preferably fixed in a conventional manner to the seat back in a manner that preserves the ergonomic design of a conventional headrest and allows all the height and/or angle adjustments typically possible.

A headrest according to the invention may be made, for example, using thermoforming of a synthetic plastic material. This synthetic material can also be reinforced and it is thus possible to make such a headrest using composite materials.

The part of the connecting line stored with the oxygen mask in the headrest is of course sufficiently long to allow the pilot to work in a normal manner while wearing his oxygen mask, without interference from the line. Similarly, the connecting line is connected to the oxygen supply circuit in a manner that does not limit adjustments of the headrest relative to the seat back, and poses no risk that the connecting line will be damaged during a headrest adjustment.

In most aircraft used for commercial purposes, the space available in the cockpit is sufficient to accommodate headrests according to the invention. It is also possible to consider further increasing the volume of the headrests in order to store other safety items such as smoke goggles 50, for example.

The solution proposed in the present invention allows the pilot (or any other user) to quickly extract his oxygen mask from the headrest. As was mentioned above, the headrest advantageously opens automatically in the case of depressurization in the cockpit. A manual opening is also advantageously provided for maintenance purposes.

In order to facilitate the extraction of the oxygen mask from its housing, the possibility of providing an indicator arm preferably equipped with a grasping means was described above. In addition to or instead of the indicator arm, it is also possible to place a small rearview mirror 52 facing the pilot (FIG. 5), arranged for example on a portion of the windshield, so that the pilot can see the headrest to facilitate grasping the oxygen mask located inside it when the headrest is open. A rearview mirror 52 is associated with each pilot seat, meaning the pilot seat and copilot seat. More generally, a separate rearview mirror is preferably provided for each seat equipped with a headrest in which is stored an oxygen mask for the user of the seat. The presence of a rearview mirror allows the pilot to coordinate his view with his arm motions as he grasps the oxygen mask. It is not a departure from the scope of the present invention if neither the rearview mirror nor the indicator arm are present. In addition, other devices facilitating the grasping of the oxygen mask may be also provided.

The above description also proposes a novel manner of integrating parts of the oxygen supply circuit into the pilot and copilot seats. The pilot seat (and copilot seat) thus integrate a part of the line and the equipment supplying oxygen not only to the pilot (or copilot), but also to any passenger located behind the pilot. This proposal allows simplifying the integration of these systems into the aircraft while freeing additional space for other systems, in particular electrical systems.

It should be noted that the parts of the oxygen supply line located at the seat do not require any special protection against impacts and/or other damage. In fact, the cockpit of an aircraft is designed in such a way that the pilot seat (and copilot seat) is protected against such impacts.

In certain configurations, it would be possible to provide the user with a connecting line allowing oxygen to flow between the pilot seat and copilot seat. In the case represented in FIG. 6 for example, such a connection could allow having only one outlet from the oxygen supply system which would further simplify the system as a whole. A connection between the pilot seat and copilot seat would be equally advantageous for the embodiment proposed in FIG. 7. In this case, for example when three occupants are present in the cockpit, the oxygen bottles of one seat would be used to supply oxygen to one passenger, while the oxygen bottles of another seat would be used to supply oxygen to two other passengers. A connecting line supplying oxygen between the pilot seat and the seat of the copilot would thus make it possible to distribute oxygen between the three passengers traveling in the cockpit.

The present invention is not limited to the preferred embodiments described above as non-limiting examples. It also relates to variants within the reach of persons skilled in the art, within the scope of the attached claims.

The invention claimed is:

1. A headrest for a pilot seat of an aircraft, comprising a lower part, equipped with a first connector structured to provide an adjustable connection of said headrest to the seat back of the pilot seat, and an upper part, located opposite the lower part,
   wherein the lower part provides a receptacle in which are housed an oxygen mask as well as a connector structured to connect said mask to an oxygen source, wherein the first connector is structured to enable movement of the upper part with respect to the lower part, between a first position in which the upper part closes said receptacle and a second position in which said receptacle is open to enable access to remove the oxygen mask from the receptacle.

2. The headrest according to claim 1, wherein the upper part forms a cover for the receptacle arranged in the lower part.

3. The headrest according to claim 1, wherein the connector comprises a hinge connecting the upper part to the lower part to permit the upper part to pivot relative to the lower part (14).

4. The headrest according to claim 3, wherein the hinge is located on a rear face opposite the front face intended to serve as a support surface for the head of a user.

5. The headrest according to claim 1, wherein the receptacle contains a supply line which is connected to the oxygen mask and coiled inside the receptacle.

6. The headrest according to claim 1, further comprising:
   an arm movable between a position in which the arm is completely retracted inside the receptacle and a deployed position in which a free end of the arm is extended outside of the receptacle, and
   a mover structured to enable the arm to move from its retracted position to its deployed position when the upper part is moved from a position in which the receptacle is closed to a position in which the receptacle is open.

7. The headrest according to claim 6, wherein the arm is equipped at its free end with a grasper connected to the oxygen mask stored in the receptacle.

8. A pilot seat of an aircraft, comprising a headrest according to claim 1.

9. The seat according to claim 8, further comprising at least one oxygen bottle, and wherein said bottle is connected to an oxygen mask placed inside the headrest.

10. The seat according to claim 8, further comprising another oxygen mask stored in the headrest.

11. The seat according to claim 8, further comprising another receptacle in which is located another oxygen mask.

12. A cockpit of an aircraft, comprising at least one seat according to claim 8.

13. The cockpit according to claim 12, comprising:
   a first seat and a second seat aligned with the first seat, wherein each of said first seat and said second seat comprises a headrest for a pilot seat of an aircraft, comprising a first part referred to as the lower part, equipped with a first connector structured to enable an adjustable connection of said headrest to the seat back of the pilot seat, and a second part referred to as the upper part, located opposite the lower part, wherein the lower part is structured to provide a receptacle in which are housed an oxygen mask as well as a second connector structured to connect said mask to an oxygen source, wherein the first connector is structured to enable the upper part to be moved with respect to the lower part, between a first position in which the upper part closes said receptacle and a second position in which the receptacle is open to enable access to remove the oxygen mask from the receptacle, and
   at least one other seat arranged behind said first seat and said second seat, and wherein at least one among said first seat or said second seat has two oxygen masks.

14. The cockpit according to claim 12, wherein the first seat and the second seat are each equipped with at least one oxygen bottle.

15. The cockpit according to claim 12, further comprising a rearview mirror arranged in front of a seat.

16. An aircraft, comprising at least one seat according to claim 8.

* * * * *